Oct. 24, 1950  B. D. ASHBAUGH  2,526,797
MOLDING PRESS
Filed Oct. 20, 1945  6 Sheets-Sheet 1

INVENTOR
BERNARD D. ASHBAUGH,
Toulmin & Toulmin,
ATTORNEYS

Oct. 24, 1950 — B. D. ASHBAUGH — 2,526,797

MOLDING PRESS

Filed Oct. 20, 1945 — 6 Sheets-Sheet 3

INVENTOR
BERNARD D. ASHBAUGH,
BY
Toulmin & Toulmin
ATTORNEYS

Oct. 24, 1950 B. D. ASHBAUGH 2,526,797
MOLDING PRESS
Filed Oct. 20, 1945 6 Sheets-Sheet 6

INVENTOR
BERNARD D. ASHBAUGH
BY
Toulmin & Toulmin
ATTORNEYS

Patented Oct. 24, 1950

2,526,797

UNITED STATES PATENT OFFICE 2,526,797

MOLDING PRESS

Bernard D. Ashbaugh, Mount Gilead, Ohio, assignor to H-P-M Development Corporation, Wilmington, Del., a corporation of Delaware Application October 20, 1945, Serial No. 623,580

10 Claims. (Cl. 18—30)

This invention relates to molding presses, and particularly to turret type molding presses.

It is an object of this invention to provide a turret type molding press which is more rapid in its operation than turret presses of this type have heretofore been.

It is another object to provide a turret type molding press in which the molds are opened and closed by fluid operable rams supplied with fluid from valves carried on one of the press strain rods.

It is still another object to provide a method of constructing a turret press which insures that the working stations of the turret will exactly align with the stationary working station of the press.

It is a further object to provide an improved indexing mechanism for the turret of a turret press such as the aforementioned molding press.

It is still a further object to provide an arrangement in a turret press wherein all of the auxiliaries are operated from a single source of power.

It is still another object to provide a turret molding press in which the cycle of operations is controlled by cam operated control devices connected with the turret indexing mechanism.

These and other objects and advantages will become more apparent upon reference to the accompanying drawings in which.

General arrangement

A press constructed according to this invention comprises a bed and a head joined by strain rods. Rotatably mounted on one of the strain rods is a turret mechanism carrying a plurality of clamps adapted for clamping mold halves which may be carried thereby.

According to this invention the mold clamps are removable bodily from the turret so that one may be removed for repair or replacement and an entire new unit placed in the turret for maintaining the production of the press at a maximum.

The head carries an injection or extrusion chamber which is aligned with the molds one after the other for injecting material therein. Connected with the injection chamber is a feed hopper which feeds by gravity into the said chamber and which has the feeding rate thereof augmented by the vacuum drawn within the said chamber as the injection plunger retracts.

For indexing the turret there is provided a Geneva mechanism, the arm of which is continuously rotated by a suitable motor means. When the turret has reached a working position, a clamping ram lifts the entire turret into engagement with the extrusion chamber nozzle and away from the aforementioned indexing arm so that an injection cycle may take place without halting the indexing arm.

The injection plunger, clamping ram and clamping units are supplied with fluid from a fluid source which is powered by the same motor which drives the indexing mechanism. Since the indexing takes place at a different time than the clamping and injecting, it is possible to use a smaller amount of power than would be required if the indexing mechanism and source of fluid pressure were separately powered.

By providing suitable control means in the hydraulic circuit, the injection plunger may be reciprocated without the indexing of the turret in order to purge the injection chamber. Also, the turret may be indexed without operating the injection plunger and, further, the turret may be operated manually.

In order to facilitate the conducting of actuating fluid to the mold clamping units, these are connected with the center post of the turret and fluid is valved to the said units from suitable ports in the strain rod about which the turret rotates.

In order more perfectly to align the molds with the injection station, the positions in the turret which receive the mold clamping units are machined after the turret has been assembled with its index plate. In this manner the variations in the index plate are automatically compensated for and the molds will align exactly with the injection chamber. The injection chamber itself is also provided with adjusting means for varying the exact position of the nozzle thereof.

Structural arrangement

Referring to the drawings, and particularly to Figures 1 to 4, it will be seen that the press comprises a bed 10 which has a reservoir 11 and an upper plate 12. Connected with the plate 12 by the strains rods 13 and 14 is a press head 15. The press head carries an extrusion or injection chamber at 16 within which is reciprocable the injection plunger 17 which is powered by a fluid motor 18 which is supported on the head 15 by the strain rods 19.

Rotatably mounted about the strain rod 14 is a turret mechanism generally indicated at 20 which comprises a lower plate 21, a hollow center post 22 and an upper plate 23, the post 22 serving fixedly to mount the plates 21 and 23 and also to journal the entire turret mechanism on the strain rod 14. Mounted on the post 22 beneath the plate 21 is a spacer block 24 and a Geneva plate 25. The lower end of the post 22 engages the upper race of a ball bearing 26 whose lower race is abutted by the upper surface of the bed plate 12.

Figure 1:
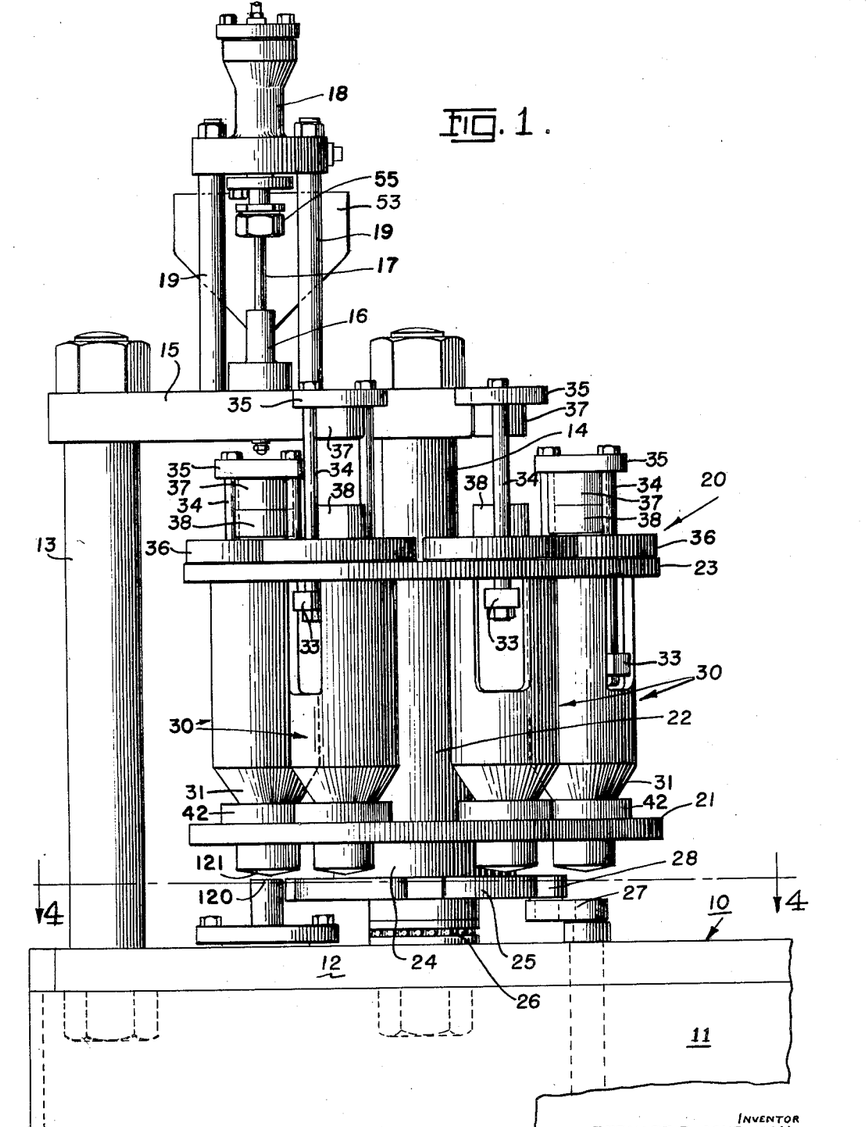
Figure 1 is an elevational view of a turret molding press constructed according to this invention.
Figure 2:
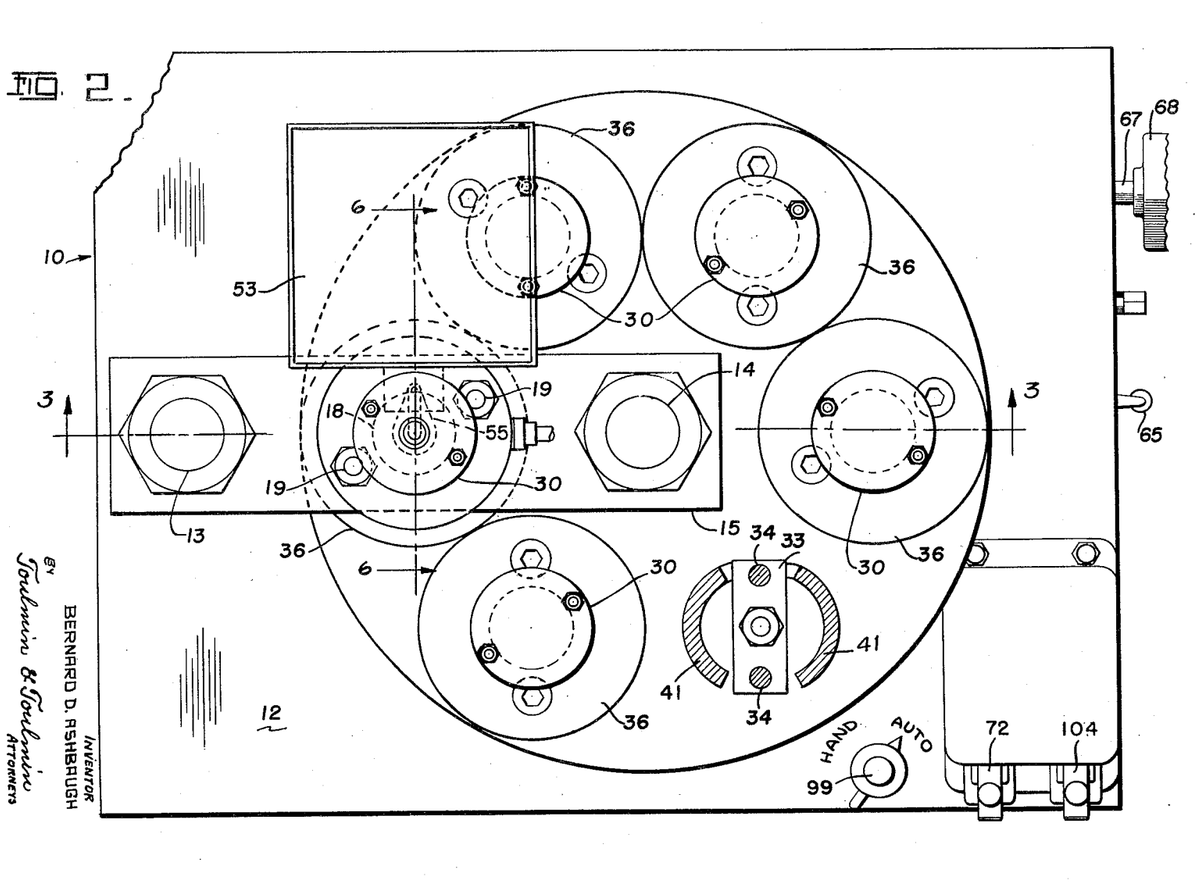
Figure 2 is a plan view of the press of Figure 1.
Figures 3, 5, 9, 10, 11:
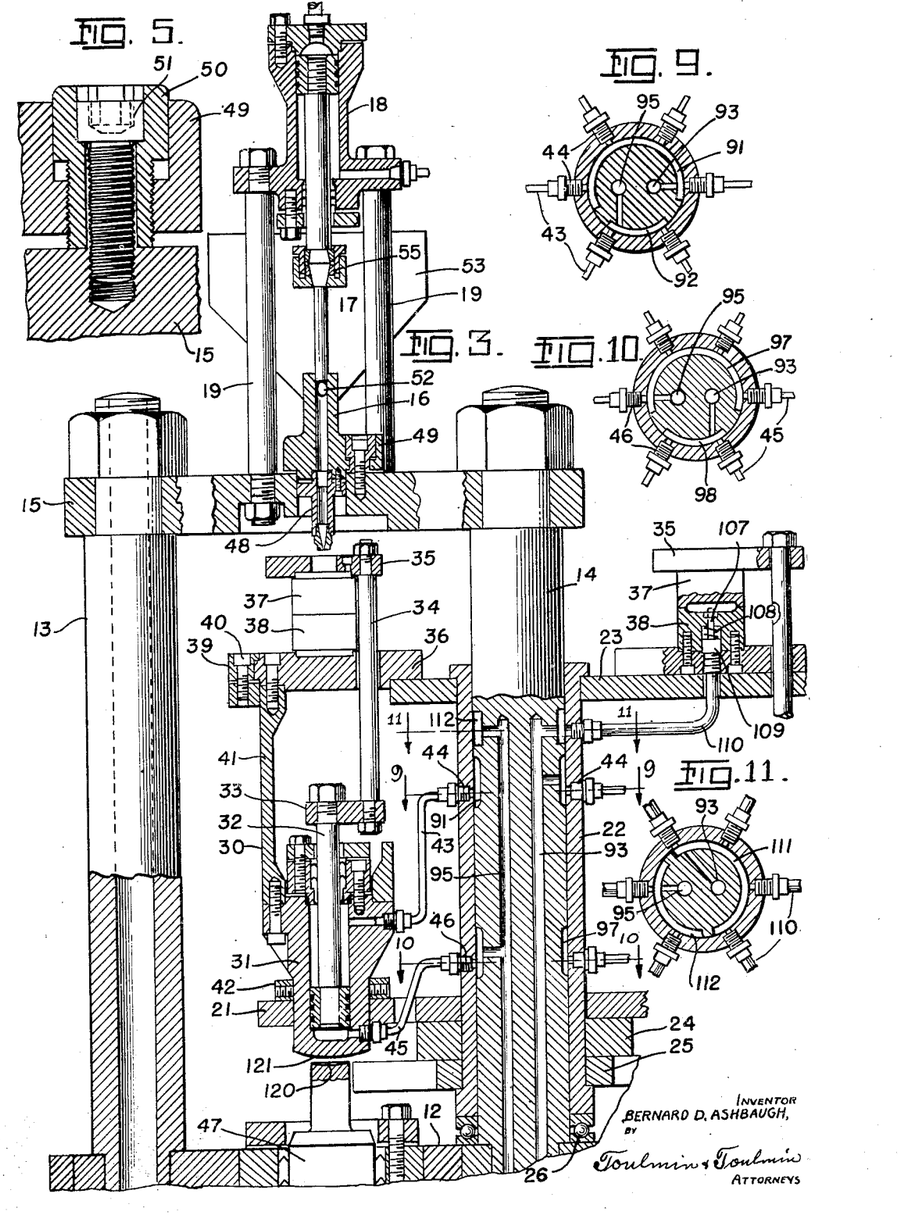
Figure 3 is a vertical section taken substantially along line 3—3 of Figure 2.
Figure 5 is a detailed view showing the manner in which the injection or extrusion chamber is aligned with the dies.
Figures 9, 10 and 11 are sectional views taken substantially along the lines 9—9, 10—10 and 11—11 on Figure 3 showing the porting of the strain rod valves.
Figure 4:
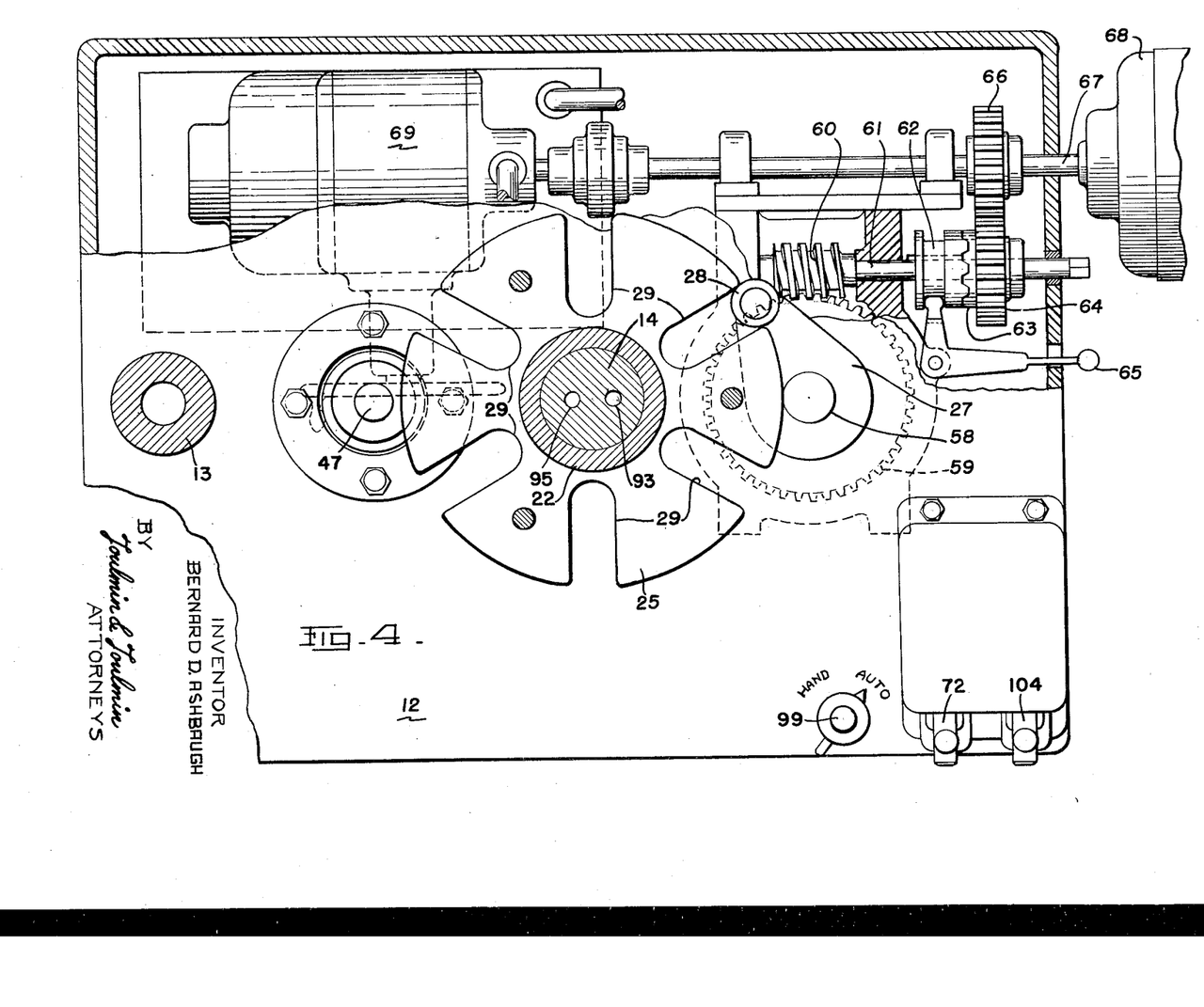
Figure 4 is a plan section of the turret indexing mechanism and power unit for the press as indicated on the line 4—4 of Figure 1.

An arm 27 is rotatably journalled in the bed plate 12 and carries a roller 28 on the end thereof for engagement with the slots 29 in the index plate 25.

The turret top and bottom plates 23 and 21 are apertured for receiving a plurality of mold clamping units generally indicated at 30. Each of the mold clamping units comprises a fluid motor 31 within which is reciprocable a plunger 32 that is connected with a cross head 33 at its outer end. The cross head 33 has connected therewith a pair of rods 34 which pass upwardly to be connected by a plate 35. The rods pass through a plate 36 and plates 35 and 36 form supports for the mold halves 37 and 38. The plate 36 is shaped to fit within the turret aperture and to abut the top plate 23 and to be secured thereto by the clamping ring 39 and bolts 40.

Connected with the plate 36 are a pair of arms 41 which extend downwardly and are secured to the cylinder of the motor 31. The arms 41 serve as compression members to resist the clamping thrust of the motor 31 on the mold halves.

The lower end of the cylinder of the motor 31 is turned to a reduced diameter and fits within the aperture of the lower turret plate 21 and has secured thereto the stop ring 42 which abuts the plate 21 on its upper surface.

The upper end of the motor 31 is connected by a conduit 43 with a port 44 in the turret center post 22 while the lower end of the motor 31 is connected by conduit 45 with a port 46 in the said center post. It will be understood that each of the several mold clamping units are arranged identically with the one described and each is connected into the turret center post by a pair of conduits, the ports of said conduits being spaced around the center post at the same angularity that the clamping units are spaced about the turret.

Mounted in the bed 10 is a ram 47 which is in alignment with the injection chamber 16. When the turret is indexed into working position, the ram 47 is adapted for actuation by fluid pressure to engage the lower end of the mold clamping cylinder in working position and to lift the entire turret upwardly until the mold in working position is forced against the injection chamber nozzle.

The injection chamber 16 comprises a lower nozzle bearing portion 48 which is bolted to the upper part and which also serves for plasticizing the material which is being molded. The portion 48 extends through an aperture in the press head 15 and the upper end of the chamber 16 is flanged as at 49 for providing a support for the said chamber.

Spaced around the flange 49 are three adjustable attaching screws, one of which is illustrated in Figure 5. Each of the adjusting screws comprises a hollow externally threaded screw 50 which passes through a bore in the flange 49 to abut the head 15. Passing through the screw 50 is another screw 51 which extends into a threaded bore in the head 15. By adjusting the screws 50 the exact position of the nozzle of the portion 48 may be adjusted and by tightening the screws 51, the adjustment so made may be locked in place.

Figure 6:
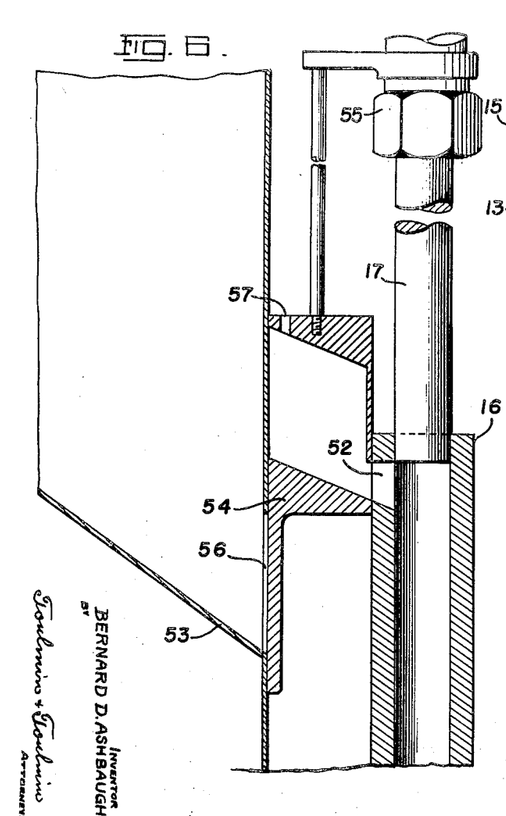
Figure 6 is a sectional view taken substantially along the line 6—6 of Figure 2 showing the feed hopper and its connection with the extrusion chamber.

Opening into the upper end of the injection chamber 16 through an aperture 52 is the hopper 53. Disposed between the hopper 53 and the aperture 52 is a feed box 54 (Figure 6) which is carried by a collar 55 on the injection plunger 17. When the injection plunger advances downwardly the box 54 is moved downwardly to communicate with the hopper 53 through the opening 56. When the injection plunger retracts upwardly, the feed box 54 communicates with the aperture 52 and transfers plastic into the chamber 16. In order to facilitate the rapid transfer of plastic from the feed box 54 to the chamber 16 there is provided the aperture 57 in the upper surface of the feed box. Then, when the injection plunger retracts and draws a vacuum in its cylinder and uncovers the aperture 52, the rush of air through the aperture 57 and the feed box 54 will carry the plastic material before it and into the injection chamber. This produces a very rapid feeding cycle and permits high speed operation of the press.

The mechanism for rotating the turret indexing arm 27 is best shown in Figure 4 wherein it will be seen that the arm 27 is carried on a shaft 58 on which is also mounted a worm wheel 59. The worm wheel 59 meshes with a worm gear 60 on the shaft 61 and the shaft 61 has slidably keyed thereto a clutch member 63 on the spur gear 64. The spur gear 64 is freely rotatable on the shaft 61 and drives the said shaft only when the clutch members 62 and 63 are engaged. The lever 65 is provided for selectively engaging or disengaging the said clutch members.

Meshing with the gear 64 is a gear 66 secured to the shaft 67 of a drive motor 68. The shaft 67 is extended, suitably supported, to be coupled to the drive shaft of a pumping unit 69 which supplies pressure fluid for the actuation of the various hydraulic auxiliaries of the press.

Figures 7, 8:
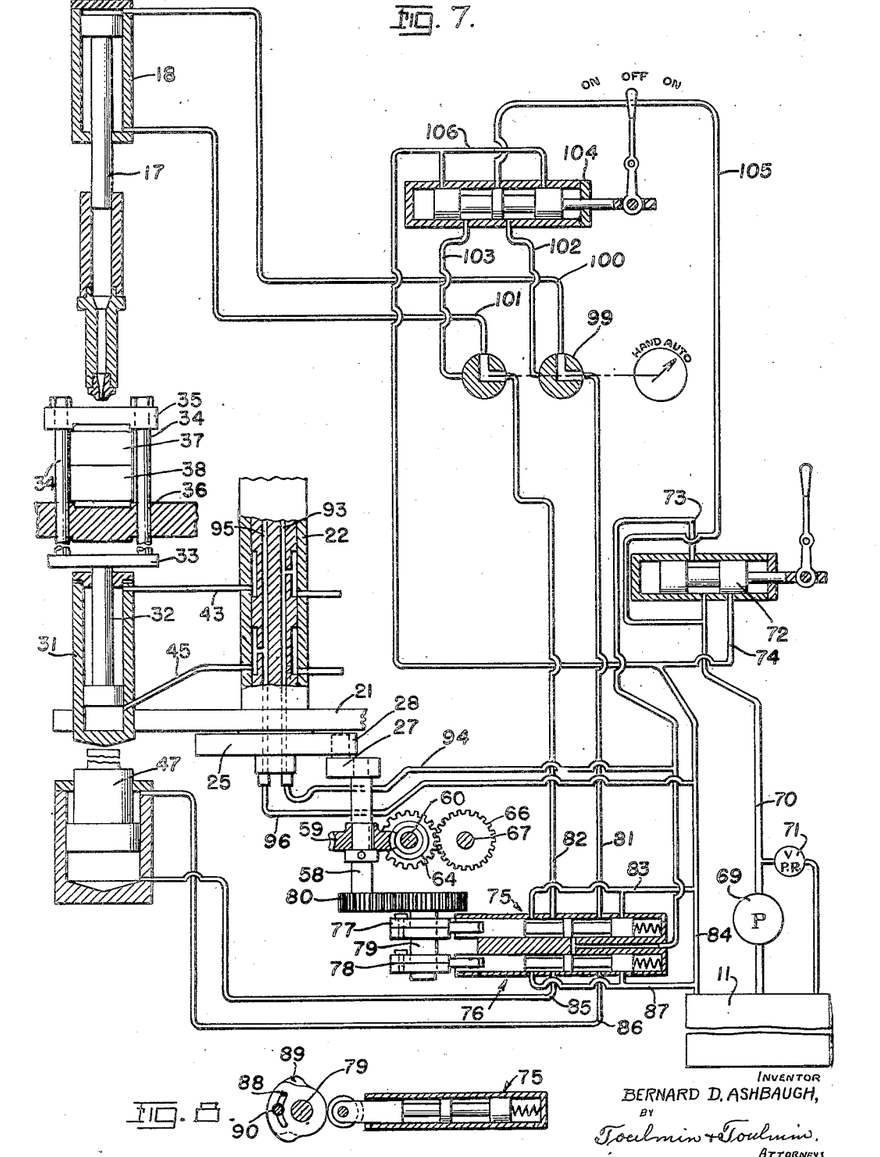
Figure 7 is a diagrammatic view of the hydraulic operating circuit.
Figure 8 is a view illustrating the arrangements of the cams for operating some of the valves of the circuit of Figure 7.

Referring to Figure 7, there is shown a hydraulic operating circuit for the press of this invention. In this view the pump 69 draws fluid from the reservoir 11 and discharges it under pressure into a conduit 70. A relief valve 71 may be provided for bypassing excessive pump delivery back to the reservoir.

The conduit 70 connects with the inlet of a valve 72 which also has connected therewith the conduits 73 and 74, the latter being an exhaust conduit and the former leading to the inlets of a pair of four-way valves indicated at 75 and 76. The valve member of the valve 72 is movable to interconnect the conduits 70 and 74 for completely unloading the hydraulic system to exhaust or, into position to interrupt communication between the conduit 70 and the conduits 73 and 74 for the purpose of cutting off the supply of pressure fluid to the valves 75 and 76 or, into position to interconnect the conduits 70 and 73.

The valves 75 and 76 are operated, respectively, by the cams 77 and 78 on the shaft 79. The shaft 79 is driven from the index arm shaft 58 through the two to one reduction gearing at 80. The index arm 27 thus makes two complete revolutions for each complete cycle of operation of the valves 75 and 76. The valve 75 comprises the service line 81 which leads to the advancing side of the injection plunger motor and the service line 82 which leads to the retracting side of the motor. Reciprocation of the valve member of the valve 75 is adapted for connecting either one of the service lines thereof with the conduit 73 while exhausting the other thereof through the conduits 83 and 84 to the reservoir 11.

The valve 76 comprises the service line 85 which leads to the advancing side of the clamp ram 47 and the service line 86 which leads to the retracting side of the said ram. Reciprocation of the valve member of the valve 76 is effective to connect either one of the service lines thereof with the conduit 73 while exhausting the other thereof through the conduit 87 to the reservoir. The aforementioned valve members are spring urged in one direction and are moved in the other direction by the cams 77 and 78.

In order to control the actuation of the valve members of the valves 75 and 76 the cams 77 and 78 may be formed, as shown in Figure 8, from a pair of plates 88 and 89 which are clamped together by a screw 90 and which may be turned relatively in order to adjust the lengths of the high and low portions of the cams. It will be apparent that reciprocation of the members of the valves 75 and 76, brought about by rotation of the shaft 79 is effective automatically to actuate the clamping ram 47 and the injection plunger 17. The arm 27 is continuously rotated by the shaft 58 and thus a full automatic indexing, clamping and injection cycle obtains.

In order to open and close the mold halves by their associated clamping motors 31 there is provided in the strain rod 14, at the level of the ports 44, the groove 91 which is continuously under pressure and the groove 92 which is continuously exhausted. Pressure is conducted to the groove 91 through a passage 93 on the strain rod which is connected by the conduit 94 with the conduit 73. The groove 92 communicates by passage 95 with a conduit 96 which connects with the exhaust conduit 84. The grooves 91 and 92 are so proportioned that the molds are clamped during about two-thirds of the rotation of the turret and are opened for the remaining one-third.

At the levels of the ports 46 is a valving arrangement comprising the grooves 97 and 98 similar, respectively, to the grooves 91 and 92 but connected in the opposite sense to the exhaust and pressure lines.

In order to provide for manual operation of the injection plunger 17, the conduits 81 and 82 pass through a three-way valve indicated at 99 which is movable to connect the conduits 81 and 82 with the conduits 100 and 101 or, to connect the conduits 100 and 101 with conduits 102 and 103. The conduits 102 and 103 are the service lines of a four-way valve 104 which is supplied with pressure fluid by a conduit 105 which is connected with the pump discharge conduit 70. The valve also comprises the exhaust conduit 106 which is connected with the conduit 84 and, therefore, the reservoir 11. By adjusting the valve 99, the injection plunger 17 may be reciprocated independently of the other functions of the machine in order to purge the injection chamber if desired.

In many molding operations it is desired that the completed workpiece have therein an aperture or recess for receiving a part to which it is desired to attach the molded article.

In Figure 3 it will be noted that the lower mold half 38 includes a plunger 107 which is urged downwardly by a spring 108 and upwardly by a piston 109 to which pressure fluid may be conducted through a conduit 110. The conduit 110 is supplied with pressure from a groove 111 in the strain rod 14 and is exhausted through a groove 112 at the same level. The grooves 111 and 112 are connected respectively with the drilled passages 93 and 95 in the said strain rod. By means of the plunger 107 it is possible to fill the mold at the injection station and thereafter to form the desired recess in the workpiece, the formation thereof serving also to intensify the pressure within the mold and to insure better workpieces. By having the plunger 107 withdrawn when the workpiece is molded, the danger of the said plunger becoming broken or bent due to the force of the injected molding material is substantially eliminated and longer mold life results.

Figure 12:
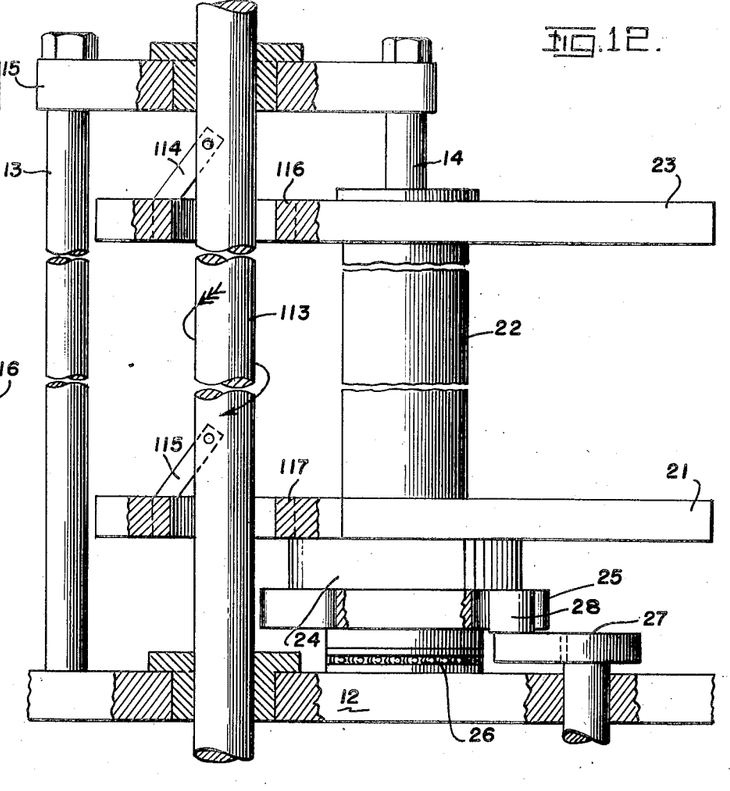
Figure 12 illustrates a method of machining the press turret for insuring the alignment of the work stations with the extrusion chamber after assembly.

Referring to Figure 12, the method of forming the mold unit receiving apertures in the plates 21 and 23 is shown. The turret plates are assembled on the turret center post 22 and mounted together with the index plate 25. The turret is then rotatably supported on its axis of rotation and is indexed into each of its operative positions by an index arm which, preferably, is the one to be employed in the assembled press for indexing the turret. At each index a boring bar 113 carrying the tools 114 and 115 is operated to bore the apertures 116 and 117. These apertures are thus aligned with each other and are angularly located exactly the same as the slots in the index plate 25. Preferably, the press is assembled and the boring bar is guided by a suitable bushing carried in the injection chamber aperture in the press head and a bushing in the aperture in the bed plate which accommodates the main clamping ram but it will be understood that good results may be obtained merely by assembling the turret together with its index plate and boring the apertures in accordance with the indexing of the turret thereby.

In operation, a full automatic cycle obtains with the valves in their Figure 7 position and fluid pressure supplied to the conduit 73. Because of the reduction gearing at 80 the index arm 27 makes two revolutions for each cycle of the press, the turret being lifted away from the said arm during one of its revolutions.

Should it be desired to index the turret manually, the valve 72 may be shifted to bypass the pump to the reservoir, the lever 65 shifted and the shaft 61 driven manually to bring the turret to any position desired.

If the turret is to be automatically indexed without the operation of the injection plunger, the valve 99 may be shifted counterclockwise into its manual operation position and the turret indexed by power. At this time the valve member of the valve 72 may be shifted rightwardly to close off the conduit 73 so that the mold clamping units and the clamping ram 47 are also idle.

Should it become necessary to replace a mold or to change the entire set up of the press, the mold clamping units together with the molds may be removed from the turret in their entirety and a new set of molds and clamping units inserted. This avoids the shutting down of the press for long periods of time in order to make repairs or changes in the molds or their clamping units.

The arrangement of the indexing arm according to this invention permits the driving thereof through the worm and wheel 60, 59 which is of the self-locking type. Thus, there is no tendency for the turret to overrun and to drive back through the said worm and wheel and the indexing of the turret becomes precisely accurate without the use of latch bolts or aligning pins. Elimination of these members permits a substantially higher speed cycle and greater production on the press is obtained. As a means of exactly aligning the turret as it is lifted by the clamping ram 47, the upper end of the said clamping ram may comprise a depression 120 which cooperates with a correspondingly shaped projection 121 on the mold clamping motors.

When the clamping ram picks up the turret to clamp it against the injection chamber, these cooperating portions are operable exactly to align the turret in its proper location.

It will be understood that this invention is susceptible to modification in order to adopt it to different usages and conditions and, accordingly, it is desired to comprehend such modifications within this invention as may fall within the scope of the appended claims.

I claim:

1. In a turret type press; a stationary working station; a turret carrying a plurality of movable working stations; means for indexing the turret to bring each of the working stations thereof into alignment with the stationary working station comprising a continuously rotating index arm and an index plate on said turret; and means operable during the working cycle of said press for lifting said turret toward said working station thereby separating said plate and arm and permitting a free rotation of said index arm during which time it does not engage said plate.

2. In a turret press; a turret; means for indexing said turret to bring the various stations thereof into working position comprising a rotatable index arm and an index plate carried by the turret, and an upward acting ram for elevating said turret free of said indexing arm during the work cycle of said press, said ram also operating to hold said turret in its indexed position.

3. In a turret press; a turret having a plurality of working positions; an index plate carried by said turret and having a plurality of slots; a rotatable index arm adapted for engagement with said slots for indexing said turret into its several operative positions; a ram energizable for engaging and lifting said turret during the working cycle of said press thereby moving said plate out of the path of said arm and permitting said index arm to make a free revolution, said ram being operable for holding said turret in its indexed position.

4. In a turret press; a press head, a press bed and strain rod means interconnecting said head and bed; a turret rotatable on said strain rod means and having spaced work stations; an index plate having slots attached to said turret and an index arm rotatable for engagement with said slots for indexing said turret; a stationary work station carried by said press for operating in association with the various work stations carried by said turret in each of its indexed positions; and means operable to lift said turret to bring a work station thereof and the stationary work station into operative engagement for a working cycle of said press, the lifting of said turret being sufficient to free the index plate from said index arm thereby permitting the latter to make an idle rotation.

5. In a turret press; a head having a working member, a bed and strain rods interconnecting said head and bed; a turret rotatable on one of said strain rods and comprising a Geneva plate; an arm rotatably mounted in said bed adapted for engagement with said plate to index said turret successively into its several operative positions; worm and wormwheel means connecting said arm with a source of power, said worm and wormwheel being self locking to prevent overrun of the turret during indexing; and a clamping ram operable to engage and to lift said turret into engagement with the working member of said press when said turret has been indexed, the lifting of said turret also being operable to disengage said plate and arm.

6. In a turret press; a head having a work member, a bed and strain rods interconnecting said head and bed; a turret rotatable on one of said strain rods and comprising a Geneva plate; said turret also comprising a plurality of circumferentially spaced fluid operable mold clamping units; valve means carried by said turret for operating said mold clamping means as said turret is indexed; an index arm rotatable in said bed for engagement with said plate for indexing said turret; self-locking worm and worm wheel means for driving said arm, said worm and wheel preventing overrun of said turret as the same is indexed; and a fluid operable clamping ram for lifting said turret to bring one of the molds thereof into working engagement with the work member of said press and also to disengage said Geneva plate from said index arm.

7. In a turret injection press having a rotatable turret, an injection station and a clamping ram; a rotatable arm for indexing said turret to bring molds carried thereby into alignment with said injection station; fluid operable means for actuating said clamping ram and said injection station; a pump for generating fluid pressures for actuating said fluid operable means; and a single motor connected to drive said pump and said rotatable arm.

8. In a turret injection press having a turret carrying a plurality of molds, an injection means for injecting molding material into said molds, and a clamping ram for clamping said molds against said injection means; fluid operable means for actuating said injection means and said clamping ram; indexing means for indexing said turret to bring the molds carried thereby successively into alignment with said injection means; means controlled by the operation of said indexing means for controlling the supply of fluid to said fluid operable means for obtaining a full automatic and synchronized work cycle; and valve means selectively adjustable to interrupt the supply of actuating fluid to said fluid operable means and thereby to render said injection means and said clamping ram inoperative during indexing movement of said turret.

9. In a turret injection press having a turret carrying a plurality of molds and an injection station for supplying the cavity of said molds with molding material; means for indexing said turret to bring the molds carried thereby successively into alignment with said injection station and for bringing about the injection of material from said station into the cavities of said molds; auxiliary plungers carried by said molds; fluid operable means for urging said plungers into said cavities for further shaping the workpieces therein; and valve means in said turret, operable automatically as said turret is indexed away from said injection station to supply pressure fluid to said fluid operable means.

10. In a turret press; a head having a fluid operable work member, a bed and strain rods interconnecting said head and bed; a turret rotatable on one of said strain rods and comprising a Geneva plate, said turret also comprising a plurality of circumferentially spaced fluid operable mold clamping units; valve means carried by said turret for operating said mold clamping means as said turret is indexed; an index arm rotatable in said bed and engageable with said plate for indexing said turret; worm and worm wheel means for driving said arm; a fluid operable clamping ram for lifting said turret to bring one of the molds thereof into working engagement with the work member of said press and also to disengage said Geneva plate from said index arm; and a second valve means connected in circuit with said fluid pressure operable work member and said clamping ram and selectively adjustable to prevent operation of said work member and said clamping ram during rotation of said turret.

BERNARD D. ASHBAUGH.

REFERENCES CITED

The following references are of record in the file of this patent:

UNITED STATES PATENTS

| Number | Name | Date |
|---|---|---|
| 975,659 | Uebelmesser | Nov. 15, 1910 |
| 1,916,495 | Shaw | July 4, 1933 |
| 1,931,375 | Cook et al. | Oct. 17, 1933 |
| 2,033,076 | Howard | Mar. 3, 1936 |
| 2,041,517 | Rule | May 19, 1936 |
| 2,107,190 | Shaw | Feb. 1, 1938 |
| 2,181,157 | Smith | Nov. 28, 1939 |
| 2,253,822 | Sundback | Aug. 26, 1941 |
| 2,262,615 | Lester | Nov. 11, 1941 |
| 2,269,953 | Morin et al. | Jan. 13, 1942 |
| 2,303,288 | Lester | Nov. 24, 1942 |
| 2,327,227 | Tucker | Aug. 17, 1943 |
| 2,333,056 | Thoreson et al. | Oct. 26, 1943 |
| 2,348,403 | Muller | May 9, 1944 |
| 2,353,276 | Stewart | July 11, 1944 |
| 2,368,756 | Flowers | Feb. 6, 1945 |
| 2,392,203 | Tucker | Jan. 1, 1946 |